United States Patent [19]
Dodd et al.

[11] Patent Number: 5,603,010
[45] Date of Patent: Feb. 11, 1997

[54] PERFORMING SPECULATIVE SYSTEM MEMORY READS PRIOR TO DECODING DEVICE CODE

[75] Inventors: James M. Dodd, Citrus Heights; Richard Malinowski, Placerville; Brian K. Langendorf, El Dorado Hills; George R. Hayek, Cameron Park, all of Calif.

[73] Assignee: Intel Corporation, Santa Clara, Calif.

[21] Appl. No.: 580,323

[22] Filed: Dec. 28, 1995

[51] Int. Cl.⁶ .................................................. G06F 13/00
[52] U.S. Cl. .......................................... 395/494; 395/481
[58] Field of Search ................................. 395/481, 494, 395/495, 496

[56] References Cited

U.S. PATENT DOCUMENTS 5,353,429  10/1994  Fitch .................... 395/494 X

Primary Examiner—David L. Robertson
Attorney, Agent, or Firm—Blakely, Sokoloff, Taylor & Zafman

[57] ABSTRACT

A method of improving computer system performance during memory reads. Prior art computer systems experience a considerable time penalty during microprocessor reads from system memory. This time penalty is mitigated by the method of the present invention, wherein data is speculatively retrieved from system memory upon receipt of a microprocessor read request. A microprocessor initiates a read request which is decoded by a memory controller. Before the decoding has completed, the memory controller speculatively begins to retrieve data from the system memory device. Thus if the decode step determines that the requested data is in system memory, the time required to retrieve the data is decreased.

18 Claims, 5 Drawing Sheets

5,603,010

PERFORMING SPECULATIVE SYSTEM MEMORY READS PRIOR TO DECODING DEVICE CODE

FIELD OF THE INVENTION

The field of the invention relates to computer system memory controllers. More specifically, the invention relates to a method and apparatus for performing speculative system memory reads.

BACKGROUND OF THE INVENTION

One type of prior computer system comprises a microprocessor connected to an external cache, a system memory, and various peripheral devices residing on a system bus. The microprocessor communicates with the cache memory, system memory, and peripherals through a memory controller chip. The memory controller chip coordinates data transfers to and from these memory components at the request of the microprocessor. One example of a prior art memory controller chip is the 82434LX/NX PCI cache and Memory controller (PCMC), manufactured by Intel Corporation of Santa Clara, Calif., the corporate assignee of the present invention.

FIG. 1 illustrates a prior art computer system employing a memory controller chip. The microprocessor 110 is coupled to an external cache 120 and system memory 130 on a host bus 160. The host bus 160 is connected to a memory controller 140. A second bus, system bus 150, is connected to the memory controller 140. The memory controller 140 functions as a bridge between microprocessor 110 and the devices that are coupled to the system bus 150. For example, system bus may include devices such as a graphics accelerator, hard drive controller, and add-in boards.

The memory controller 140 handles data transfer requests from the microprocessor 110. The memory controller 140 receives the read or write request from the microprocessor 110 and determines which device is the data source or target. The microprocessor issues a read or write request using standard microprocessor timings.

One type of prior memory controller 140 includes a microprocessor interface (for communicating with the microprocessor), a cache controller (for communicating with the external cache), a system memory controller (for communicating with the system memory) and a bus controller (for communicating with the system bus). These functional components of the memory controller are included within one integrated circuit chip. Alternatively, some manufacturers split the functions among more than one chip.

The microprocessor interface unit of the memory controller receives, for instance, read commands from the microprocessor and determines (1) the "source", i.e. the device containing the requested data, and (2) at what address within the device the data is to be found. If the source is determined to be a device on the system bus, the bus controller takes over. If the source is determined to be system memory, the system memory controller takes over. Upon a request for a system memory read, the cache controller searches the cache for the requested data. If the desired read data is in the cache, there is a cache hit and the data is sent back to the microprocessor. The system memory controller senses the cache hit and does not proceed with the system memory read. This method of retrieving data from the cache improves computer system performance by reducing the amount of time it takes for the microprocessor to retrieve system memory data.

Although the system performance is improved by using an external cache, there is also a considerable time penalty associated with a system memory read that does not hit in the cache. For one example of a system memory comprising dynamic random access memory (DRAM), it takes 7 clocks to retrieve the first data word from system memory. However, if the microprocessor were to request two data words from system memory, it would take considerably less time (i.e. 2 clocks) to return the second data word.

Some prior art computer systems take advantage of this time savings by retrieving an entire line (four data words) from system memory during a read operation, whether or not the entire line was requested by the microprocessor. The entire line is then placed in the cache. For a computer system based on a Pentium® Processor manufactured by Intel Corporation of Santa Clara, Calif., each data word comprises 64 bits.

Thus it can be appreciated that in order to improve system performance during a system memory read, the number of clock cycles required to return a first data word from system memory should be reduced. It is therefore desirable to provide for a method by which system performance may be increased by decreasing the time required to retrieve a data word from system memory.

SUMMARY OF THE INVENTION

A method of improving computer system performance during memory reads is described. A microprocessor requests a memory read by specifying an address and a memory source, indicating the location of the desired data. Decode circuitry decodes the memory read request to identify the memory device corresponding to the memory source. In parallel to the decoding of the memory read request, speculative data is retrieved from system memory based on the incoming address. If the decode circuitry determines that the system memory was not the requested memory source, the speculative read is aborted. The speculative data is thus not used by the microprocessor. If the decode circuitry determines that the system memory was the requested memory source, then the speculative data is provided to the microprocessor.

Other features and advantages of the present invention will be apparent from the accompanying drawings and the detailed description that follows.

BRIEF DESCRIPTION OF THE DRAWINGS

The present invention is illustrated by way of example and not limitation in the accompanying figures and in which.

DETAILED DESCRIPTION

A method and apparatus for performing speculative system memory reads is described. In the following description, numerous specific details are set forth, such as specific system components, bus cycles, and timing waveforms in order to provide a thorough understanding of the present invention. It will be apparent, however, to one skilled in the art that these specific details need not be employed to practice the present invention. In other instances, well known components or methods have not been described in detail in order to avoid obscuring the present invention.

Figure 1:
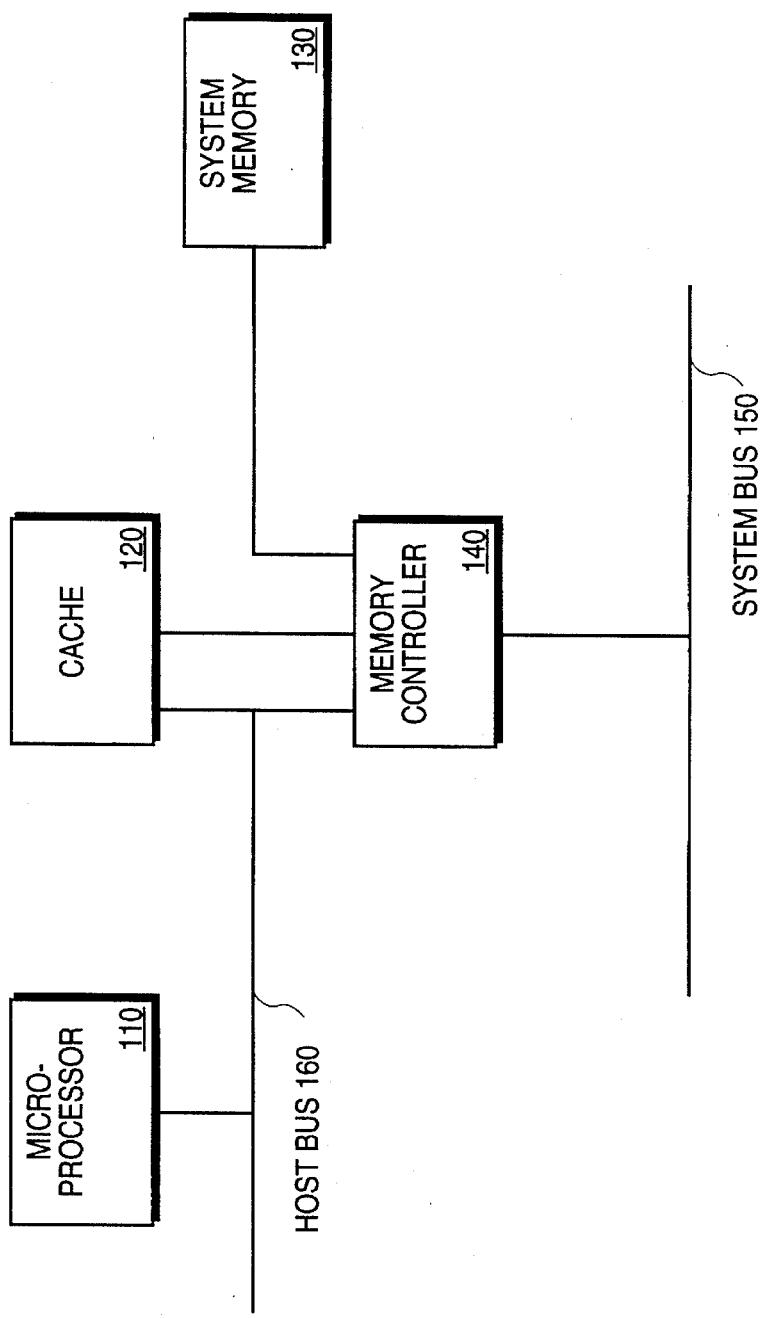
FIG. 1 illustrates a prior art computer system.
Figure 2:
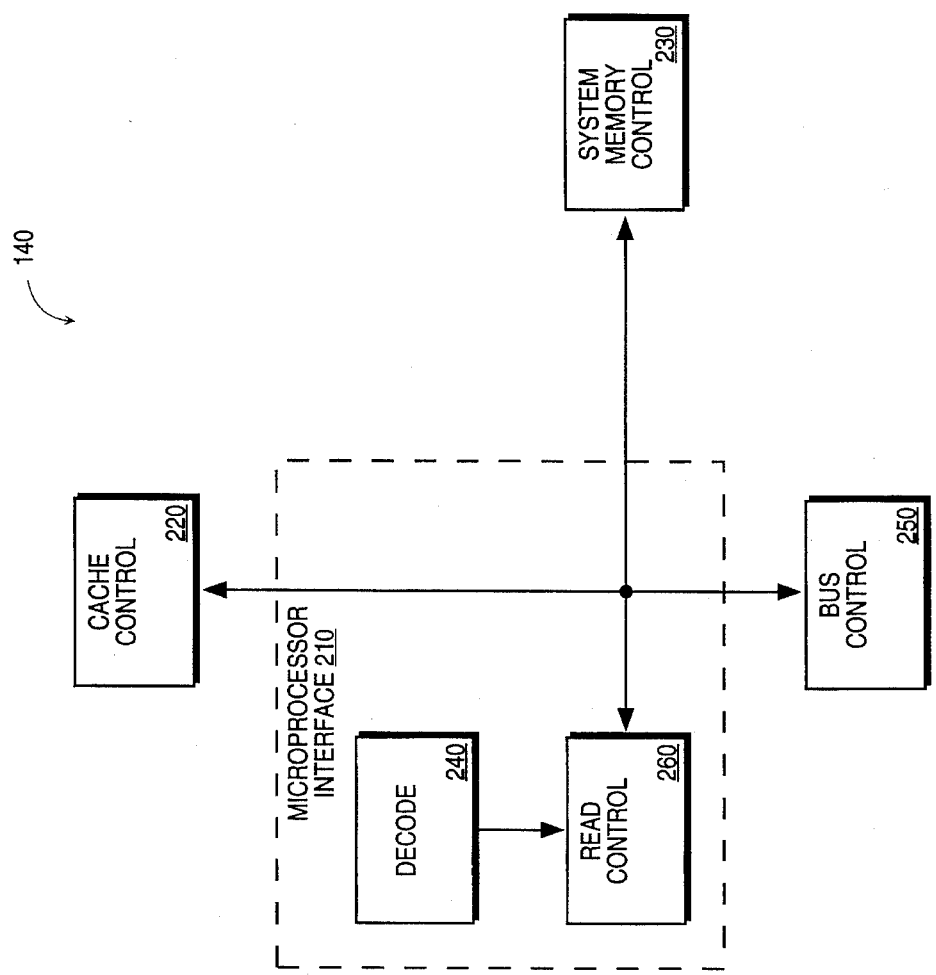
FIG. 2 illustrates a prior art memory controller.

Referring to FIG. 2, a prior art embodiment of the memory controller 140 is shown. The memory controller 140 comprises a microprocessor interface 210, including decode circuitry 240 and read control circuitry 260. The memory controller 140 further comprises cache controller 220, bus controller 250 and system memory controller 230.

The microprocessor interface 210 is coupled to the microprocessor 110 via the host bus 160. For an alternative embodiment of the invention, one or more microprocessors are also coupled to memory controller 140 via host bus 160. The microprocessor 110 requests read and write operations by asserting signals over the host bus 160 to the memory controller 140. The decode circuitry receives the signals over the host bus 160 and determines (1) whether a read or write operation is requested, (2) what the read source device and the write target device are, and (3) what the desired address within the read source device or write target device is.

If it is determined that a read operation is requested, then control is transferred to the read control circuitry 260. The read control circuitry 260 is responsible for controlling read operations from either the system bus 150, the system memory 130, or the cache 120. For one embodiment of the invention, the read control circuitry 260 comprises a state machine. The operation of the read control state machine will be described in more detail herein below.

The cache controller 220 controls accesses to and from cache 120. One function of cache controller 220 is to maintain cache coherency. Each time the microprocessor 110 requests data from system memory 130, the cache 120 is checked to see if it contains the requested data. If so, a cache hit has occurred and the data is read from the cache 120 rather than system memory 130. Alternatively, if the data is not found in the cache 120, a cache miss occurs and the data is transferred from system memory 130 to both the microprocessor 110 and the cache 120. For one embodiment, the cache controller comprises a state machine.

For one embodiment, the cache 120 employs a "write-through" cache coherency protocol. During a microprocessor write to system memory 130, when a cache hit is detected, both the data within the cache 120 and system memory 130 are updated. If a cache miss is detected, then only system memory is updated.

Alternatively, the cache 120 employs a "write-back" cache coherency protocol. During a microprocessor write to system memory 130 that hits in the cache 120, only the cache 120 is updated with the new data. The new data is then written back to system memory 130 at a later time. When a microprocessor write misses the cache 120, only system memory 130 is updated.

For one embodiment, the cache 120 comprises burst static random access memory (SRAM). For another embodiment, the cache 120 comprises asynchronous SRAM. The size of the SRAM array may comprise 256 kilobytes, 512 kilobytes, or any other appropriate size as determined by the configuration of the computer system.

The memory controller 140 further comprises a system memory controller 230. System memory controller 230 is responsible for providing appropriate control signals to the system memory 130 in response to read and write requests from microprocessor 110. For one embodiment, the system memory controller 230 comprises a state machine.

For an embodiment, the system memory 130 comprises a DRAM array. An embodiment of the system memory controller 230 therefore comprises a refresh timer circuit for providing refresh signals to the DRAM.

The bus controller 250 is used to control requests of the system bus 150. For example, the microprocessor 110 may request data from a peripheral device that is coupled to the system bus 150. The bus controller 250 then asserts the appropriate address and control signals on the system bus 130, according to the system bus protocol. For one embodiment, the system bus protocol is the peripheral component interconnect (PCI) protocol, and thus the bus controller 250 functions as a PCI bridge.

The bus controller 250 also interfaces between system memory 130 and the system bus 150. For instance, a device residing on the system bus 130 requests to read data from or write data to system memory 130. The bus controller 250 drives the appropriate signals to the system memory 130 in order to complete the operation.

Figure 3:
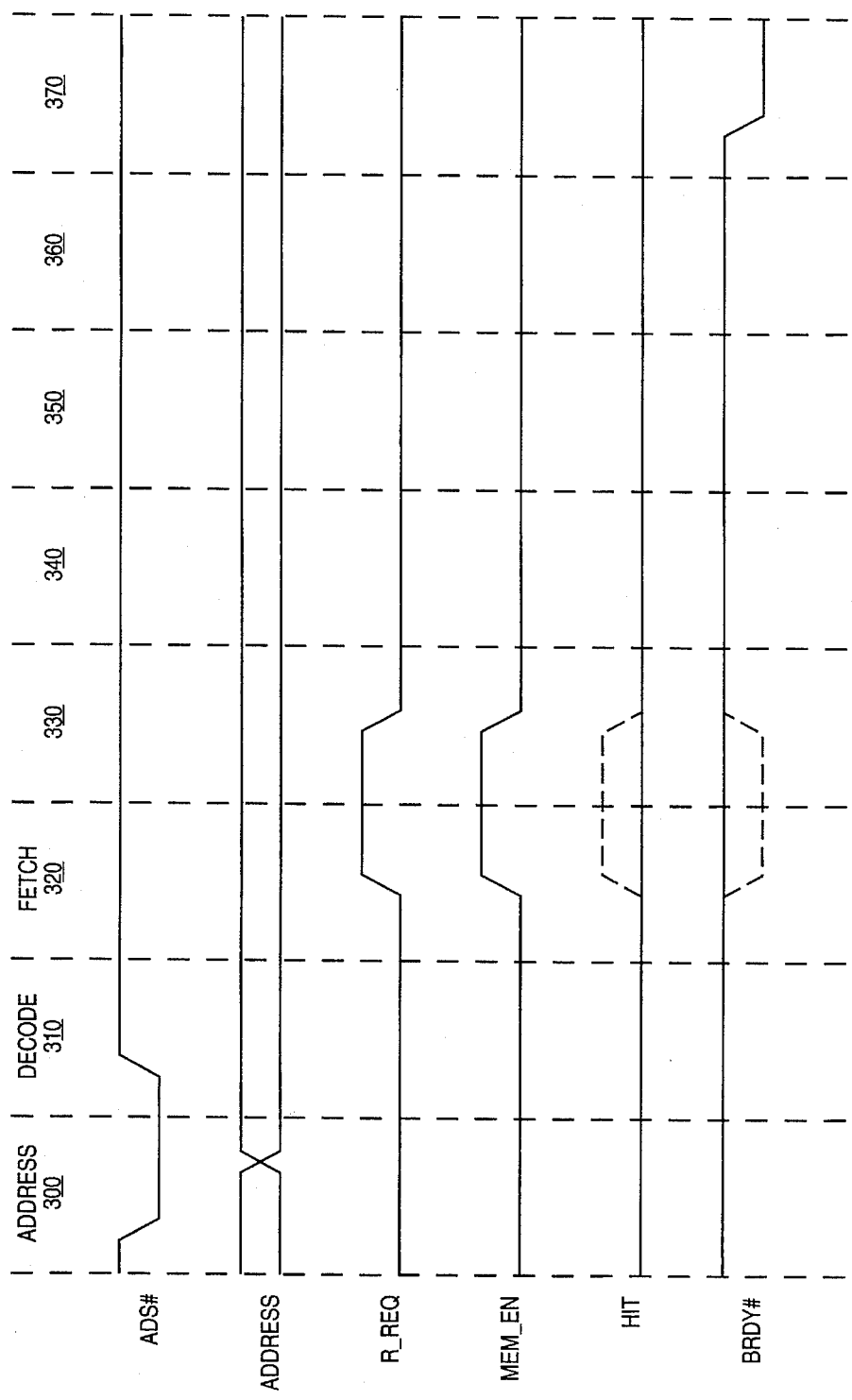
FIG. 3 illustrates a timing diagram of signals asserted during a prior art memory read request.

FIG. 3 illustrates a timing diagram of a prior art read request from the microprocessor 110. Throughout the following discussion, signal names will be referred to as "asserted" and "deasserted." Those signals designated by the "#" symbol are active low and therefore are asserted in the logical 0 state. The other signals are active high, and thus are asserted when in the logical 1 state. It should be appreciated by one skilled in the art that the designation of the signals as active low or active high does not limit the scope of the present invention.

One problem faced by prior art memory controllers is that it takes a certain minimum number of clocks to retrieve a data word from memory. It is difficult to reduce this minimum clock count for two reasons. First, much of the latency is dependent upon the specified access time of the system memory device 130. Second, the amount of time spent in decoding the read request and setting up the corresponding signals is required, and thus is difficult to reduce. For example, the timing diagram of FIG. 3 illustrates that using a prior art memory controller, it took 7 clocks to return data to the microprocessor 110 in response to a read request.

During clock 300, a read request is asserted by the microprocessor 110. The microprocessor 110 asserts the address strobe, "ADS#," on the host bus 160 to indicate the initiation of a bus cycle. During the same clock, the microprocessor 110 asserts an address on the ADDRESS signal bus. For one embodiment, the ADDRESS signal bus comprises a 32 bit bus. Alternatively, the ADDRESS signal bus comprises one of various other widths, depending on the particular microprocessor and computer system configuration.

The address is received by the decode circuitry 240 in decode clock 310. The decode circuitry thereafter processes the address. The address may indicate a data request from either system memory 130 or from a device coupled to the system bus 150. The decode circuitry 240 transfers control to the read control circuitry 260 for the read request operation.

The read control circuitry 260 enables the appropriate control block, depending on which device was specified by the microprocessor 110 in its read request. During clock 320 the read request signal, R_REQ, is asserted by the read control circuitry 260. Additionally, the memory enable signal MEM_EN is asserted by the read control circuitry 260 to indicate that system memory is the requested source to be read from. The system memory controller 230 senses the MEM_EN signal and asserts the required signals to the system memory 130 in order to complete the read operation.

Recall that whenever a system memory read or write is performed, the cache 120 is searched. If it is determined that the cache 120 has the requested data, then the HIT signal is asserted by cache controller 220 in clock 320. When the HIT signal is detected by the read control circuitry 260, the read control circuitry 260 causes the system memory control 230 to abort the system memory read operation. During the same clock 320, the burst ready, or BRDY#, signal is asserted by the cache controller 220 on the host bus 160 to indicate that data has been placed on the microprocessor 110 data pins in response to the read request.

Assuming that the read operation does not hit in the cache, the system memory controller 230 continues with the system memory read during clocks 330–370. The requested data is then returned to the microprocessor 110, and may be written to the cache 220, during clock 370. The BRDY# signal is asserted simultaneously. Note that for the embodiment shown in FIG. 3, it takes 7 clocks to return the data from the system memory 130. Note that the majority of the clocks were used by the system memory controller 220 in retrieving the requested data.

One prior art embodiment of the system memory controller 230 retrieves four consecutive data words, even if only one word is requested, from the system memory controller. The four words are then stored in the cache in case they are required at a later sequence in the microprocessor program. The four words are retrieved because it takes considerably less clocks to retrieve an adjacent data word once the first word has been read. For instance, one embodiment of a cache controller performs a read of four consecutive reads, the first using 7 clocks and the second through fourth using 2 clocks. Thus the memory controller is capable of performing a 7-2-2-2 memory read cycle.

As was mentioned previously, it is often difficult to reduce the number of clock cycles required to retrieve the first data word from system memory 150. As will be described below, however, the method of the present invention mitigates this problem by performing a speculative system memory read during every microprocessor read operation.

Thus a method and apparatus for performing speculative system memory reads is described. The method as described is performed by a memory controller comprising decode circuitry, read control circuitry, and bus controller.

Recall that in the prior art method, the microprocessor read request was decoded in clock 310 and the data was retrieved in clock 320. By contrast, the method of the present invention reads data from the system memory 130 in parallel to the decode step. If the decode step determines that the system memory was the requested source, then the data is returned to the microprocessor 110 a clock early. If, by contrast, the decode step determines that the system memory was not the requested source then the data retrieved from the system memory is simply not used.

Figure 4:
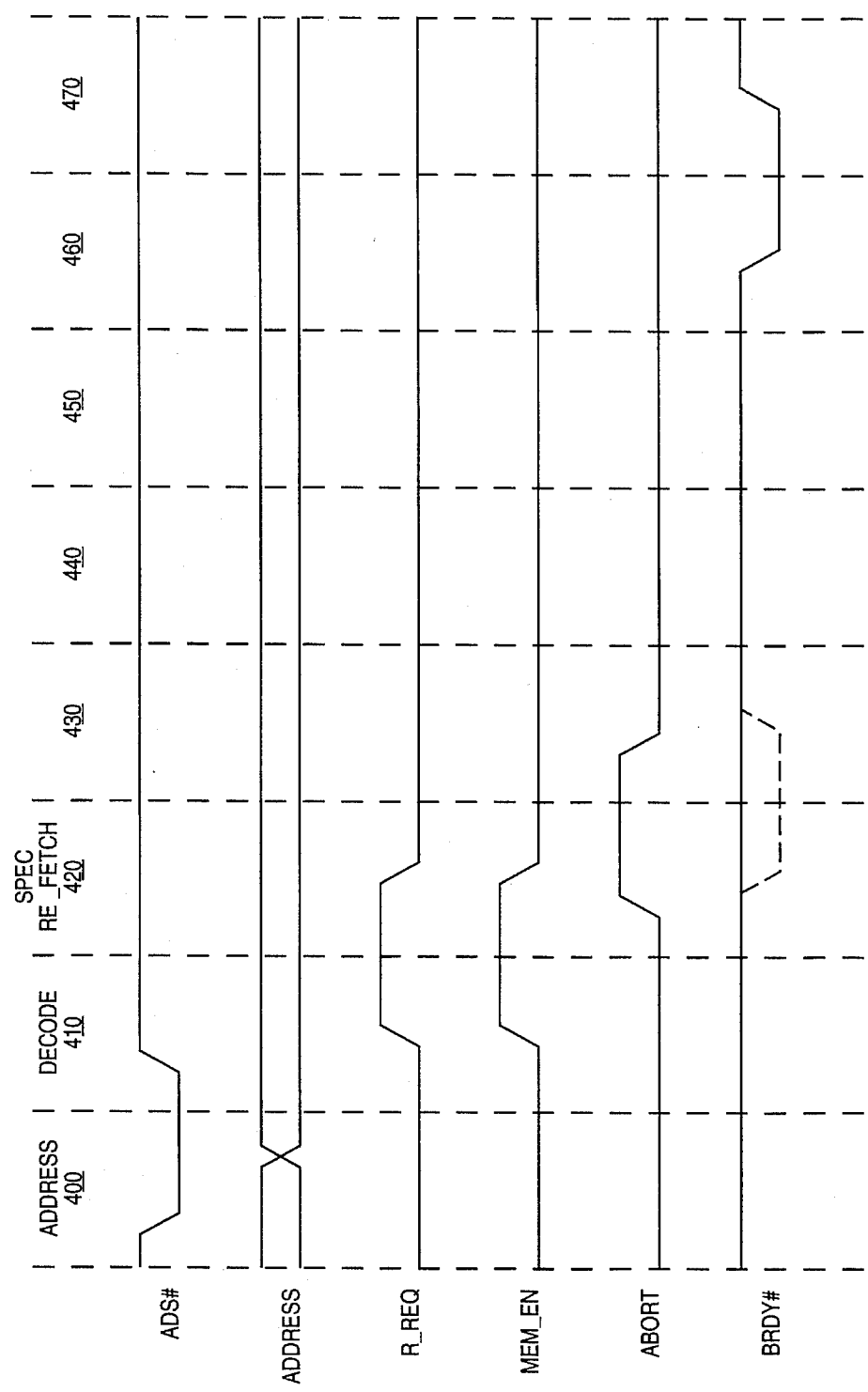
FIG. 4 illustrates a timing diagram of signals asserted in accordance with one embodiment of the present invention.

FIG. 4 illustrates a timing diagram in accordance with one embodiment of the present invention. Similarly to the method shown in FIG. 3, the microprocessor 110 initiates a read request and thus the ADS# signal is asserted in clock 400. In the same clock, the address signals are asserted on the ADDRESS signal bus. As described above, the ADDRESS signal bus comprises a plurality of bits. For one embodiment of the invention, a first group of the ADDRESS bits indicates which device the microprocessor desires to read data from. A second group of ADDRESS bits indicates the address within the desired device at which the data is located. It should be appreciated that the particular assignment of ADDRESS bits depends on the type of microprocessor, memory devices, and bus protocols used, and thus is not meant to limit the scope of the present invention.

The decode circuitry 240 decodes the read request from the microprocessor 110 during clock 410. During the same clock, the R_REQ signal is asserted to indicate a read operation, and the MEM_EN signal is asserted to indicate a read from system memory 130. Note that the read control circuitry 260 asserts these signals one clock earlier than in the timing diagram of FIG. 3. This is because the read control circuitry 260 directs the system memory controller 230 to perform a read from system memory 130, irrespective of the decode circuitry 240. The system memory controller 230 performs the read from system memory 130 by using the second group of ADDRESS bits, indicating the position within the memory device that the requested data resides.

The decode circuitry 240 finishes decoding the read request from the microprocessor 110, and takes appropriate action in clock 420. If the decode circuitry 240 indicates that the requested device (i.e. the first group of ADDRESS bits) indicated that the system memory 130 was the correct source, no action is taken. Thus the data is retrieved from the system memory during clocks 430–460. The BRDY# signal is then asserted in clock 460 to indicate that the data is ready on the microprocessor 110 data pins.

By contrast, if the decode circuitry 240 detects that the system memory 130 was not the proper source for the data, it asserts an ABORT signal during clock 420. This situation would arise if the microprocessor 110 requested a read from a device on the system bus 150, for instance. The ABORT signal is detected by the read control circuitry 260 and the system memory controller 230. Upon detecting the ABORT signal, the system memory controller 230 halts the current read operation. For one embodiment, the system memory controller 230 comprises a state machine, including a state in which the read operation is gracefully exited upon receiving the ABORT signal.

Note that for the embodiment described herein, the cache control logic 220 is not affected by the speculative read of the system memory 130. The cache control logic 220 searches the cache 120 for the requested data under the direction of the read control circuitry 260.

Figure 5:
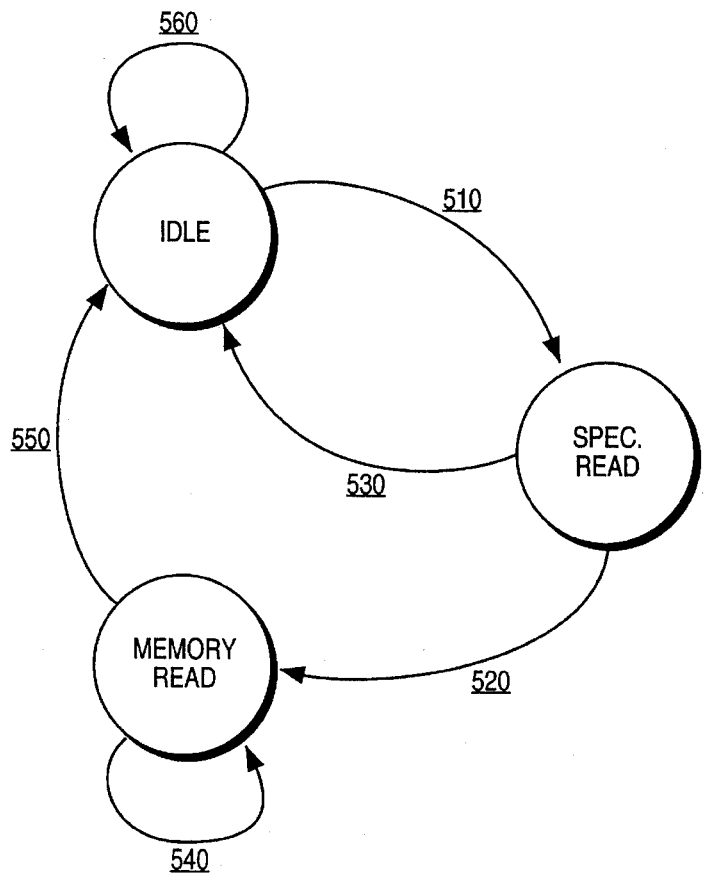
FIG. 5 illustrates a state diagram in accordance with one embodiment of the present invention.

FIG. 5 illustrates a state machine for one embodiment of the read control circuitry 260. The IDLE state indicates that no read operation is currently being performed. The SPEC READ state indicates that a speculative read is being performed by the system memory controller 230. The MEMORY READ state indicates that a non-speculative system memory read is being performed by the system memory controller 230.

The state machine starts in the IDLE state. Upon receiving the read request from the microprocessor 110 (i.e. the ADS# signal), the SPEC READ state is entered, as is shown by path 510. If no system memory read is received, the read control circuitry remains in the IDLE state via path 560.

The read control circuitry 260 remains in the SPEC READ state until one of two conditions occurs. If the decode circuitry 240 determines that the system memory 130 is the correct device, then the MEMORY READ state is entered via path 520. If the decode circuitry determines that the system memory 130 is not the correct device, then the IDLE state is entered via path 530. It is during this state that the system memory controller 230 gracefully halts the speculative read operation.

The read control circuitry 260 remains in the MEMORY READ state (as is shown by path 540) while the system memory 130 is being accessed. Once the data has been retrieved and becomes available, as is indicated by the assertion of BRDY#, the read control circuitry 260 enters the IDLE state via path 550.

For one embodiment, the state machine of FIG. 5 comprises a programmable logic array (PLA). Alternatively, the state machine of FIG. 5 is implemented using stored instructions, such as microcode. For yet another embodiment, the state machine of FIG. 5 comprises combinational logic gates and flip-flops.

Thus a method and apparatus for performing speculative system memory reads is described. The method is performed by a memory controller for interfacing between a microprocessor and (1) an external cache, (2) system memory, and (3) a system bus. Alternatively, the method of the present invention may be performed in a microprocessor computer system lacking one or more of the above-described devices. Moreover, the present invention may also be employed in a computer system employing more than one microprocessor, more than one system memory device, more than one device on the system bus, or more than one external cache.

In the foregoing detailed description a method and apparatus for performing speculative system memory reads is described. The method and apparatus of the present invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of improving computer system performance during memory reads, the method comprising the steps of:
    (A) receiving a read request specifying a first memory source and a first address within said first memory source from which requested data is to be read;
    (B) decoding said read request to identify a device corresponding to said first memory source; and
    (C) speculatively initiating a fetch of data from a system memory using said first address, before step (B) has been completed.

2. The method of claim 1, wherein said system memory comprises dynamic random access memory (DRAM).

3. The method of claim 1, further comprising the steps of
    (D) finishing said decoding of said read request in step (B), and
    (E) aborting step (C) if step (D) determines that said device corresponding to said first memory source is not said system memory.

4. The method of claim 3, wherein said read request is asserted by a host, and wherein step (E) further comprises the step of
    returning said data to said host if step (D) identifies said device corresponding to said first memory source as said system memory.

5. The method of claim 4, wherein said host is a microprocessor, and wherein said read request is issued using microprocessor read timings.

6. A method of automatically performing a read operation, comprising the steps of:
    (A) receiving a read command from a host specifying a location of first data by including first address signals and first device signals;
    (B) decoding said first device signals to identify a first device containing said first data;
    (C) speculatively initiating a fetch of data from system memory before step (B) has been completed, wherein said data corresponds to said first address signals;
    (D) completing said decoding of said first device signals in step (B); and
    (E) returning said data to said host in response to said read command if step (D) identifies said first device as said system memory.

7. The method of claim 6, wherein said system memory further comprises dynamic random access memory (DRAM).

8. The method of claim 6, wherein step (E) further comprises the step of:
    aborting step (C) if step (D) determines said first device is not said system memory.

9. The method of claim 6, wherein said host is a microprocessor, and wherein said read command is issued by said host according to microprocessor read timings.

10. A memory controller, comprising:
    (A) speculative read control circuitry that receives a read command from a host that includes an address and a device code, and wherein said speculative read control circuitry speculatively initiates a fetch of data from a system memory device using said address of said read command immediately upon receiving said read command and before said device code has been decoded; and
    (B) decode circuitry that decodes said read command to identify a memory device that is associated with said device code.

11. The memory controller of claim 10, wherein said speculative read control circuitry further comprises a state machine.

12. A computer system, comprising:
    a host;
    a system memory device;
    a memory controller, coupled to said host and said system memory device, said memory controller further comprising
        (A) speculative read control circuitry that receives a read command from said host, wherein said read command includes an address and a device code, and wherein said speculative read control circuitry speculatively initiates a fetch of data from said system memory device using said address of said read command immediately upon receiving said read command and before said device code has been decoded; and
        (B) decode circuitry that decodes said read command to identify a memory device that is associated with said device code.

13. The computer system of claim 12, wherein said speculative read control circuitry further comprises a state machine.

14. The computer system of claim 12, wherein said system memory device comprises dynamic random access memory (DRAM).

15. The memory controller of claim 10, wherein said decode circuitry further comprises circuitry that asserts an abort signal to said speculative read control circuitry if, upon completion of decoding said read command, said decode circuitry determines that said memory device identified is not said system memory device.

16. The computer system of claim 12, wherein said decode circuitry further comprises circuitry that asserts an abort signal to said speculative read control circuitry if, upon completion of decoding said read command, said decode circuitry determines that said memory device identified is not said system memory device.

17. A memory controller, comprising:

(A) speculative read control means for receiving a read command from a host that includes an address and a device code, and speculatively initiating a fetch of data from a system memory device using said address of said read command immediately upon receiving said read command and before said device code has been decoded; and (B) decoding means for decoding said read command to identify a memory device that is associated with said device code.

18. The memory controller of device 17, wherein said decoding means further comprises means for asserting an abort signal to said speculative read control means if, upon completion of decoding said read command, said decoding means determines that said memory device identified is not said system memory device.

* * * * *